Feb. 13, 1962    E. G. McLAUGHLIN    3,021,519
RELAY ENERGIZATION INDICATOR
Filed Dec. 12, 1958    2 Sheets-Sheet 1

INVENTOR.
Edward G. McLaughlin.
BY W. L. Stout
HIS ATTORNEY

Feb. 13, 1962 E. G. McLAUGHLIN 3,021,519
RELAY ENERGIZATION INDICATOR
Filed Dec. 12, 1958 2 Sheets-Sheet 2

INVENTOR.
Edward G. McLaughlin
BY
W. L. Stout
HIS ATTORNEY 3,021,519
RELAY ENERGIZATION INDICATOR
Edward G. McLaughlin, Eastmont, Pa., assignor to Westinghouse Air Brake Company, Wilmerding, Pa., a corporation of Pennsylvania
Filed Dec. 12, 1958, Ser. No. 779,888
8 Claims. (Cl. 340—373)

My invention relates to indicators, and particularly to an improved energization indicator for electromagnetic relays.

There is an increasing tendency in control and communication practice to employ totally enclosed plug-in components such as relays, which are protected by their enclosures from dust, moisture and mechanical damage. For example, the style PM relay manufactured by Union Switch & Signal Division of Westinghouse Air Brake Company is widely employed in such systems. The use of such relays, however, may present a problem in service and maintenance not encountered with previous known forms of relays, in that it is not apparent from an inspection of the relay whether it is energized or deenergized. It is possible to determine the condition of the relay, of course, by connecting an electrical measuring instrument across selected ones of its terminals, but this procedure is time consuming and expensive and frequently is impractical because of the location of the relay.

Accordingly, it is an object of my present invention to provide an indicator which may be readily slipped over the outside of a relay without disturbing its electrical function or making connections to any of its terminals, with which the energized or deenergized state of the relay can readily be determined.

It is a further object of my invention to provide an improved system for checking the sequence of operation of a plurality of relays without interfering with their normal operation.

Other objects and further advantages of my invention will become apparent to those skilled in the art as the description proceeds.

In accordance with one embodiment of my invention, hereinafter to be described in detail, I provide a housing, which may be slipped over the outside of the enclosure of the relay to be tested, and in which is pivotally mounted a metallic indicating element which is resiliently biased into one indicating position and which may be attracted into a second indicating position by the energizing flux of the relay.

In practice, my invention can be applied to any relay of the type in which the electromagnetic flux of the relay operating coil is not completely shielded. Obviously, relays enclosed in non-conducting enclosures, or relays which are only partially enclosed, are in this class. Further, I have found that even relays that are substantially shielded and are entirely enclosed in a conducting container, exhibit sufficient leakage flux in the neighborhood of a pole to operate the indicator of my invention. For example, my indicator has been found to be well adapted for use with the relay shown in United States Patent No. 2,775,666 to Branko Lazich, which is assigned to the assignee of my present application.

In checking the sequence of operation of a plurality of relays, in accordance with a second embodiment of my invention, I mount an indicator on each relay to be checked. In each indicator, the indicating element is arranged to operate a contact, and each of the contacts is connected in a circuit to control one channel of a multiple channel recorder. The record thus obtained clearly indicates the sequence of operation of the relays without interfering with their function.

I shall first describe two embodiments of the indicator of my invention and one embodiment of a sequence checking system employing the second embodiment of my indicator in detail, and shall then point out the novel features thereof in claims.

In the accompanying drawings, FIG. 1 is an elevational view, partly in section, showing a first embodiment of an indicator applied to a conventional miniature relay.

Figure 1:
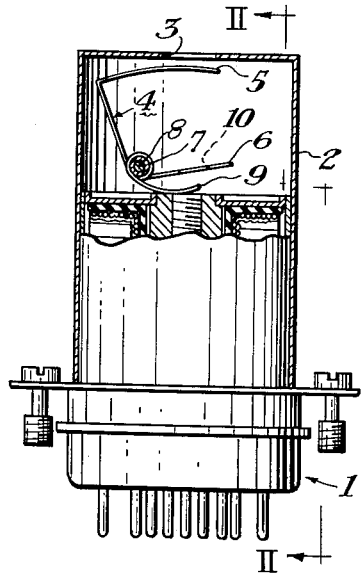

Referring now to FIG. 1, I have shown a conventional relay 1, which may be of the type shown and described in Lazich Patent No. 2,775,666 referred to above. As described in the patent, this relay is so constructed that the external casing actually forms a part of the magnetic circuit. While this relay is substantially shielded for most practical purposes, there is sufficient leakage flux around the central area of the top of the relay to form an external magnetic pole when the relay is energized. My indicator is adapted to employ the presence or absence of this flux to indicate the energized or deenergized condition of the relay.

As shown in FIG. 1, the indicator of this embodiment of my invention comprises a housing 2, which may be made of any suitable material such as sheet metal, plastic, or the like, and which is shaped to fit the outer contours of the relay casing snugly so that the housing 2 may be readily slipped on or off the relay, but when slipped on will be retained by friction. As shown, the housing is substantially in the form of a right section of a circular cylinder. However, a cylindrical section of any other cross section, or other form, could obviously be employed, the principal requirement in the broadest aspects of my invention being that the housing must be capable of ready attachment to and detachment from the relay to which it is to be applied.

Figure 4:
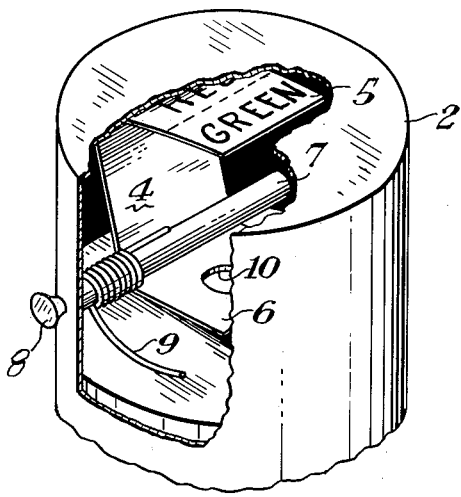
FIG. 4 is an enlarged cut-away perspective view of the indicator shown in FIGS. 1 through 3.
Figure 3:
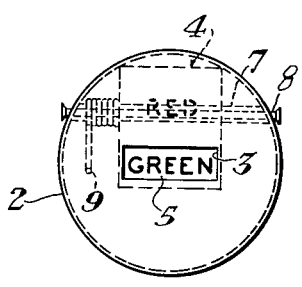
FIG. 3 is a top plan view of the indicator of FIG. 1.

Inside housing 2 an indicating element 4 is pivoted. This element comprises a U-shaped strip of ferromagnetic material such as magnetic steel having an upper arcuate portion 5 and a relatively flat lower portion 6, which may be apertured, as at 10, if necessary to clear any protuberances on the relay. As best shown in FIG. 4, the upper portion 5 of indicating element 4 is marked into relatively distinguishable front and rear portions, which may, for example, be painted red and green, respectively, as shown.

Figure 2:
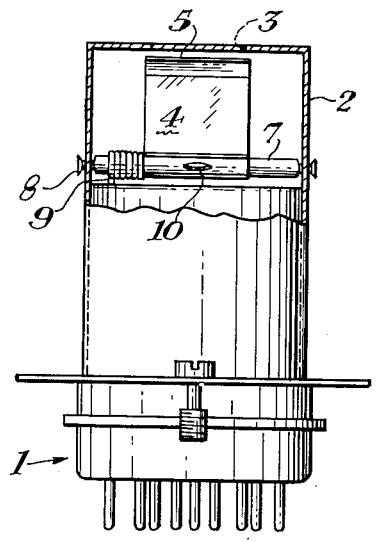
FIG. 2 is a sectional view of the assembly shown in FIG. 1 taken substantially along line II—II in FIG. 1.

Within the lower angle of the U formed by element 4 is a tubular bearing member 7, secured by any suitable means such as welding, soldering, brazing or the like. As shown in FIGS. 2 and 4, tubular member 7 is journalled in housing 2 in any suitable manner, as by a pin 8 which extends through apertures in the walls of housing 2, and is riveted over at the ends as shown.

A spring 9 is wound about tubular bearing member 7 on one side of the indicator, as shown in FIG. 4, and has its inner end fastened to indicator 4 by any suitable means, such as soldering, welding, or brazing. The other end of spring 9 extends outwardly so as to contact the upper portion of the relay casing, as shown in FIGS. 1 and 2, to normally bias the indicator to the position shown in FIG. 1, in which the outer green portion of the indicator is visible through a window 3 provided in the top of housing 2. Window 3 is here shown merely as an aperture through which one panel of the upper portion of the panel is visible. However, this window could be glazed with glass or plastic if desired.

In operation, my indicator when employed for test or indication purposes can be readily moved from one relay to another in a relay rack by simply slipping the housing over the selected relay, upon which spring 9 will tend to bias indicator 4 to the position in FIG. 1. If the relay is then energized, or becomes energized, lower portion 6 of indicator 4 will be attracted to the upper portion of the relay casing and the indicator will pivot about pin 8 to carry the green portion of the indicator past the window and expose the red or energized indication to view through the window. It will thus be apparent that I have provided an indicator for readily detecting the energized or deenergized condition of the relay without disturbing its function or interrupting its circuit connections.

Figure 5:
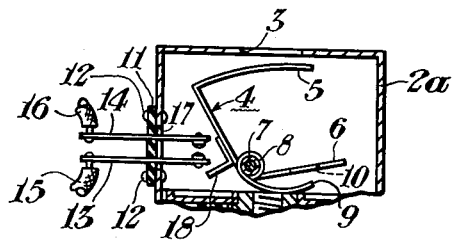
FIG. 5 is a fragmentary elevational view, partly in section, of a second embodiment of my invention.

Referring now to FIG. 5, there is shown a modification of the indicator of FIGS. 1–4 which is particularly adapted for use in operation sequence checking. This indicator may correspond, as to details not shown, to the indicator of FIGS. 1–4, and FIG. 5 will be seen to correspond to a portion of FIG. 1 with respect to elements that are the same in both modifications. In the indicator of FIG. 5, indicating element 4 is mounted by means of tubular member 7 and pin 8 in the same manner as shown in FIG. 1, and is restrained in the same way by spring 9 so that the outer portion of upper arcuate portion 5 is visible through window 3 until the lower portion 6 is attracted downwardly to bring the inner portion of arcuate portion 5 into view through window 3.

Cover 2a of the indicator of FIG. 5 corresponds to cover 2 of FIGS. 1–4, except that it is provided with an aperture 17 facing the rear of element 4 as shown. A pair of contacts 13 and 14 extend through aperture 17, and are secured in spaced relation by any suitable means, as by being embedded in a plastic strip 11 secured to cover 2a by rivets 12 or other suitable means. A pair of leads 15 and 16 may be soldered to the external ends of contacts 13 and 14, respectively, to control an external indicating circuit, as will appear.

In order to close contacts 13 and 14 when the indicator is actuated, a lug 18, of any suitable insulating material such as plastic or the like, is secured to indicating element 4 by gluing, resin bonding or other conventional means. Upon actuation of element 4 to its energization indicating position as previously described, lug 18 engages contact 13 and moves it into engagement with contact 14 in a manner apparent from the drawing.

Figure 6:
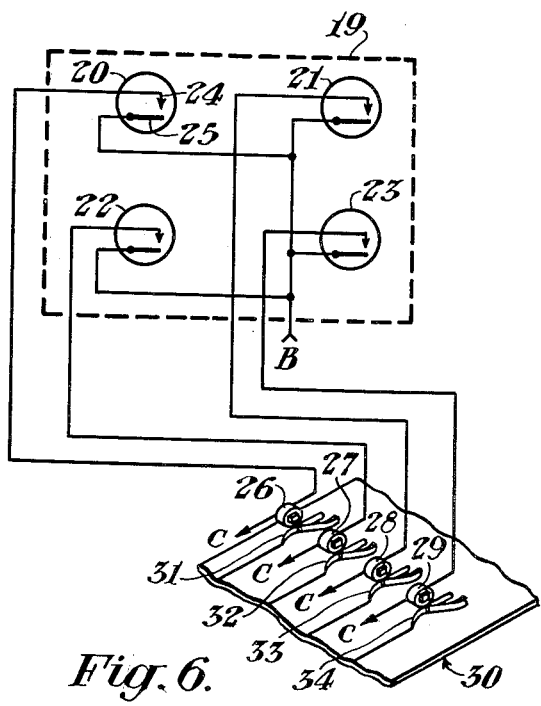
FIG. 6 is a schematic wiring diagram of a sequence checking system employing indicators of the type shown in FIG. 5.

FIG. 6 shows schematically a system employing indicators of the type shown in FIG. 5 to check the operating sequence of a group of relays. A relay rack 19 is shown schematically, including for illustrative purposes four relays provided with indicators 20, 21, 22 and 23. These indicators may be of the form shown in FIG. 5. Each indicator is provided with a pair of contacts such as contacts 24 and 25 of indicator 20, which may be formed and mounted as shown in FIG. 5, so that when a relay is energized, the contacts of the corresponding indicator are closed. One of each pair of contacts is connected to terminal B of a source of energy such as a battery, not shown, and the other contact of each pair is connected to the control magnet of one channel of a multiple channel recorder 30. In particular, the contacts of indicators 20, 21, 22 and 23 are connected to magnets 26, 28, 27 and 29, respectively, the other terminals of the magnet coils being connected to the opposite terminal C of the battery, not shown, as schematically indicated. The details of recorder 30 are not shown, as they form no part of my present invention. However, United States Patent No. 2,066,309 to Earl M. Allen, for Recording Mechanism, which was filed on September 25, 1935 and issued on January 5, 1937, shows a multiple channel recorder of a type which could be employed for the purposes of my invention. As indicated in FIG. 6, and as more fully described in the Allen patent, upon energization of one of magnets 26, 27, 28 and 29, the associated pen 31, 32, 33 or 34 is attracted to a new position to draw a line parallel to and displaced from the normal line. In this manner, the sequence of actuation of the relays associated with indicators 20, 21, 22 and 23 is made readily apparent from the resulting graph.

It will be apparent to those skilled in the art that upon graphing one cycle of operation of a group of relays, the indicators may be pulled off the relays and put on another group of relays to check their sequence of operation. In this way, a large system may be checked in a relatively short time and without disturbing the operation of the system in any way.

While I have described in detail only two embodiments of the indicator, and one embodiment of the sequence checking system, of my invention, it will be apparent to those skilled in the art that many changes and modifications may be made without departing from the scope of my invention. Accordingly, I do not wish to be limited to the details shown, but only by the scope of the following claims.

Having thus described my invention, what I claim is:

1. Apparatus for indicating the energized or deenergized condition of a miniature relay of the totally enclosed type exhibiting an external ferromagnetic effect when energized, comprising, in combination, a cylindrical housing shaped to conform to the exterior of the relay and removably mounted thereon, a ferromagnetic indicator pivoted in said housing and having a portion disposed to be attracted to a first indicating position by said external ferromagnetic effect, resilient means connected to said indicator for biasing it to a second indicating position in the absence of a ferromagnetic component of a predetermined magnitude, and an aperture in said housing for observing the position of said indicator.

2. Apparatus of the class described, comprising, in combination, a strip having first and second end portions formed at angles with a central portion, bearing means secured in the angle adjacent said first end portion, a spring disposed on said bearing means and having one end secured to said strip and the other end extending outwardly from said bearing means, a cylindrical housing having an open end and an end closed except for an aperture, said spring being disposed on said bearing means in position to be engaged by an object inserted into the open end of said housing, and means journalling said bearing transversely in said housing with the second end portion of said strip adjacent said aperture.

3. Apparatus for checking the sequence of operation of a plurality of enclosed relays, comprising, in combination, a magnetic energization indicator for each relay to be checked, each indicator having a mounting portion for temporarily mounting it on an enclosed relay, each indicator having a movable ferromagnetic element resiliently biased to one position and attractable to a second position by leakage flux surrounding the relay when energized, contacts connected to each indicator, means connected to each element for actuating its associated contacts in the second position of the element, a multiple channel recorder having a recording channel for each relay to be checked, control means for determining the recorded output of each channel, and means connecting the contacts of each indicator to one of said control means, whereby the recorded outputs of said recorder channels are varied in a sequence corresponding to the sequence of actuation of said indicator.

4. A magnetic energization indicator, comprising, a housing means for removably mounting said housing on a relay, a ferromagnetic element movably mounted in said housing, means connected to said element for resiliently biasing it to a first position, said element having an attractable portion disposed to be attracted by leakage flux surrounding the relay to move the element to a second position when the relay is energized, an arm fixed to said element, and contacts mounted on said housing in position to be actuated by said arm in the second position of said element.

5. A relay energization indicator, comprising, in combination, a housing means for removably mounting said housing on a relay, said housing having an aperture at one end thereof, a ferromagnetic element movably mounted in said housing and adapted to be attracted to a first position by leakage flux surrounding said relay, resilient means for biasing said element to a second position, said element having a portion disposed to be partially viewed through said aperture, first and second indicia on said portion in position to be in view through said aperture in the first and second positions of said element, respectively, contact means secured to said housing, and means mounted on said element for actuating said contacts upon movement of said element.

6. A relay energization indicator, comprising, in combination, a housing means for removably mounting said housing on a relay, a ferromagnetic element movably mounted in said housing and adapted to be attracted to a first position by leakage flux surrounding said relay, resilient means for biasing said element to a second position, contact means secured to said housing, means mounted on said element for actuating said contacts upon movement of said element, and means controlled by said contacts for indicating the energized and deenergized conditions of the relay.

7. As a new article of manufacture, a cylindrical housing closed at one end, said closed end being provided with an aperture, a shaft transversely mounted in said housing, a bearing on said shaft, a U-shaped strip secured to said bearing with arms extending transversely of said housing, one of said arms adjacent said aperture having inner and outer portions distinctively marked on a side facing said aperture, and a spring mounted on said bearing and having one end secured to said strip and the other end extending away from said bearing in position to be engaged by an object inserted into the open end of said housing.

8. A relay energization indicator for determining the energized or deenergized state of an electromagnetic relay of the type having an external magnetic field when energized which extends beyond the outer casing of said relay, comprising, in combination, a housing adapted for attachment to the casing of said relay; an indicating element pivotally mounted within said housing and having a first and a second position, first and second indicia on said indicating element, an aperture in said housing adapted to display one or the other of said indicia according as said indicating element is in its first or second position respectively, and a spring with one end thereof connected to said indicator and having an opposite end positioned to engage a portion of the casing of said relay, when said housing is attached thereto, to resiliently bias said indicator to its first position, said indicator being attracted to its second position when said relay is energized.

References Cited in the file of this patent

UNITED STATES PATENTS

| | | |
|---|---|---|
| 511,731 | Doolittle | Dec. 12, 1893 |
| 1,612,504 | Furman | Dec. 28, 1926 |
| 1,754,868 | Wehling | Apr. 15, 1930 |
| 2,363,799 | Mahurin | Nov. 28, 1944 |
| 2,504,012 | Edwards | Apr. 11, 1950 |
| 2,517,316 | Holmes | Aug. 1, 1950 |
| 2,787,689 | Stoecklin et al. | Apr. 2, 1957 |
| 2,852,736 | Spahn | Sept. 16, 1958 |

UNITED STATES PATENT OFFICE
CERTIFICATE OF CORRECTION

Patent No. 3,021,519                         February 13, 1962

Edward G. McLaughlin

It is hereby certified that error appears in the above numbered patent requiring correction and that the said Letters Patent should read as corrected below.

Column 4, line 68, after "housing", first occurrence, insert a comma; column 5, lines 5 and 19, after "housing", each occurrence, insert a comma.

Signed and sealed this 5th day of June 1962.

(SEAL)
Attest:

ERNEST W. SWIDER
Attesting Officer

DAVID L. LADD
Commissioner of Patents